United States Patent [19]

Murray

[11] Patent Number: 5,034,808
[45] Date of Patent: Jul. 23, 1991

[54] UNIFIED AUTOMATIC VIDEO AND AUDIO SIGNAL CONTROL AND DISTRIBUTION SYSTEM

[76] Inventor: Harold R. Murray, S-120 Rte. 7, North Paramus, N.J. 07652

[21] Appl. No.: 357,882

[22] Filed: May 30, 1989

[51] Int. Cl.$^5$ .................. H04N 7/10; H04H 1/02
[52] U.S. Cl. .......................... 358/86; 455/6; 381/85
[58] Field of Search .......... 358/86; 455/3-6; 381/82, 85, 86, 123

[56] References Cited

U.S. PATENT DOCUMENTS

| | | | |
|---|---|---|---|
| 2,344,541 | 3/1944 | Ferris et al. | 369/47 |
| 2,908,766 | 10/1959 | Taylor | 381/79 |
| 3,005,873 | 10/1961 | Jahowsky | 381/1 |
| 4,035,589 | 7/1977 | Parke . | |
| 4,070,698 | 1/1978 | Curtis et al. . | |
| 4,352,200 | 9/1982 | Oxman | 455/6 X |
| 4,513,284 | 4/1985 | Right . | |
| 4,835,604 | 5/1989 | Kondo et al. | 358/86 |

FOREIGN PATENT DOCUMENTS 2032229 4/1980 United Kingdom .
WO86/02224 4/1986 World Int. Prop. O. ............ 358/86

OTHER PUBLICATIONS

M. R. Hannen, "Audio Channel Priority Control", *New Electronics*, vol. 10, No. 11, May 31, 1977, p. 22.

Primary Examiner—Jin F. Ng
Assistant Examiner—Stella L. Woo
Attorney, Agent, or Firm—Oliff Berridge

[57] ABSTRACT

A video and audio signal control and distribution system for mobile use includes an audio select logic controller for selection and distribution of one of an AM/FM radio signal, a video tape audio track signal and a microphone signal based on a hierarchical signal arrangement. The system further includes video signal transmission circuitry and video monitors which are triggered to an on state whenever the video tape audio track signal is selected by the audio select logic controller.

37 Claims, 6 Drawing Sheets

UNIFIED AUTOMATIC VIDEO AND AUDIO SIGNAL CONTROL AND DISTRIBUTION SYSTEM

BACKGROUND OF THE INVENTION

The present invention relates generally to systems for controlled transmission of video and audio signals. More specifically, it relates to a unified system for controlled automatic selection and transmission of video and audio signals for use in mobile vehicles.

Systems for the electronic production of video signals or audio signals are known in the art. For example, video cassette recorders (VCR's) with their associated amplifiers, monitors and speaker systems convert images and sounds recorded on magnetic tape or optical disk to images and sounds perceivable by the human senses. Audio signals, such as RF signals or signals recorded on magnetic tape or optical disk, may be transformed into humanly perceivable sounds by radios, cassette tape players or optical disk players. Controls for such systems include selectors for one of several active channels, stations or programs, volume and tone controls, and advance/rewind controls.

Typically, such systems are stationary and operate on power provided by an AC power source. Audio systems have been adapted for use in airplanes to provide taped entertainment and information via headsets worn by passengers. Video entertainment, such as motion picture films, typically has been supplied on airplanes by well known projection machines displaying the visual image on a screen commonly viewed by numerous passengers. Public announcement systems have also been adapted to airplane use, as with the microphone and speaker systems used by airplane crew members.

Several devices have attempted to provide some degree of signal selection in audio systems. For example, U.S. Pat. No. 4,070,698 to Curtis et al. discloses an audio system in which one of several tracks of a multi-track tape player is selected for transmission. A timer control is provided for activating the tape player. The taped recordings include periodic commercial messages which are played while the background recording of music is caused to fade. Curtis et al. is designed to be used in commercial establishments, such as grocery stores, to allow automatic periodic recorded announcements without the need for an operator to interrupt the background music to make a live announcement. Curtis et al. does not provide for integration and automatic selection of multiple audio sources and video transmission, and does not teach or suggest the use of a low voltage, low current power supply.

Another device which attempts to provide some degree of audio signal selection is disclosed in U.S. Pat. No. 4,513,284 to Right. In Right, several control consoles are interconnected and are also connected to a plurality of remote stations. Each console is connected to a separate audio input and to the remote stations at which the audio signal is transformed into audible sounds. Each console has a hierarchical position relative to the other consoles, and when a console is activated, the consoles of a lower hierarchical position are disconnected from the remote station.

Right does not teach a single control for a plurality of audio signals, nor does Right teach or suggest the integration and automatic selection of video and audio signals. Moreover, Right teaches accomplishment of control of the audio output of the system simply by connecting and disconnecting the audio signals of selected consoles from the remote stations, rather than by the selection of a single audio signal by a unified central control to be transmitted to an audio output mechanism. Right also fails to teach or disclose any means for meeting changing output power requirements.

Another device which attempts to provide some degree of audio signal selection is described in U.S. Pat. No. 4,035,589 to Parke. In Parke, a single audio amplification and transmission device is provided for use in mass transit vehicles to provide background music and means for making public announcements. In this system, one audio signal is provided by a magnetic tape recording and playback device and another audio signal is provided by a microphone, as for public announcements. A time delay network in the system provides for the partial rewinding of the tape when the microphone is in use and for restart of the tape playback when the microphone is no longer in use.

Parke does not provide for the transmission of the audio signal of a video tape in addition to an audio tape recording signal and a microphone signal. Moreover, Parke does not provide for integration of a video signal with audio signals, nor does it provide for the automatic transmission of video and audio signals in accordance with a predetermined signal hierarchy. Parke also does not teach or suggest the use of a low voltage, low current power supply which would allow reduction of the size of the device. Parke also does not teach or disclose means to add additional power amplifiers to the system to meet changing output power requirements.

It can be seen that known systems do not provide a unified video and audio signal control and distribution system capable of automatically selecting one of a radio/tape audio signal, an audio signal associated with a video tape, and a public announcement system audio signal according to a predetermined signal selection hierarchy. Nor do such systems provide for the integration of a plurality of video monitors with an automatic signal selection means.

Another disadvantage of such systems is that they are not readily adaptable to mobile vehicle use, such as in a tour bus, in which compact size, ability to operate on low supply current, input sensitivity adjustment and variable output power capability are highly desirable features. Furthermore, use of such systems in mobile vehicles would require substantial operator training to ensure proper use, and would require that the operator of a vehicle physically operate the system while the vehicle is in motion, thereby presenting a safety hazard.

SUMMARY OF THE INVENTION

The present invention avoids the disadvantages and limitations of known devices by providing a single system in which video as well as audio signals are selected, amplified and converted to visual and audio forms perceivable by human senses. Generally, the system includes a power supply, a video output signal generator, an audio output signal generator, a video output device, an audio output device, an audio amplifier and an audio select logic controller to which all of the foregoing components are connected.

In one embodiment, the system includes a video tape player as the video output signal generator, an AM/FM radio as the audio output signal generator, speakers as the audio output device and video monitors as the video output device. The system is designed to be compact, and may operate on a 12 volt d.c. power supply so that it can be used in mobile vehicles such a tour buses and the like. Of course, the system may be used in stationary settings, if desired.

In operation, when the video output signal generator is not being operated, the audio select logic controller routes the audio signal from the audio output signal generator through the audio select logic controller and the audio amplifier to the audio output device of the system. During this operation, the video output device remains off.

When the video output signal generator is operated, a trigger signal is generated by the audio select logic controller and is sent to the video output device to enable a video image to be displayed. The audio select logic controller routes the audio signal from the video output signal generator through the audio select logic controller and the audio amplifier to the audio output device of the system. During this operation, the audio select logic controller prevents the signal from the audio output signal generator from being sent to the audio output device.

One embodiment of the present invention also provides a microphone audio input to the audio select logic controller. If, for example, the bus driver wishes to make an announcement, he may activate the microphone and begin speaking. The audio input to the audio select logic controller, whether from the video output signal generator or from the audio output signal generator, is automatically overridden when the microphone is activated. Thus, the driver does not have to make any manual adjustment of the system or take any action to disable the video output signal generator or audio output signal generator when he wishes to make an announcement. The hierarchy of signals is provided by the audio select logic circuitry of the controller.

Another embodiment of the present invention includes a video distribution amplifier with means for adjusting the input sensitivity of the amplifier in order to optimize the matching of the amplifier to its source. The system may also include audio input adjustment and solid state audio analog switching in lieu of mechanical audio relays.

Accordingly, it is an object of the present invention to provide a unified system for automatic control and distribution of video and audio signals.

It is another object of the present invention to provide a unified system for automatic control and distribution of video and audio signals in mobile vehicles which is compact in size, which selects from among multiple video and audio signals, and which provides for addition of power amplifiers as required.

It is yet another object of the present invention to provide a unified system for automatic control and distribution of video and audio signals in mobile vehicles which has low supply current requirements and which includes automatic signal switching and signal selection interlock, video input signal sensitivity adjustment and audio signal input level adjustment.

It is a further object of the present invention to increase the reliability of audio signal selection in mobile vehicles subject to vibratory forces by utilization of solid state audio analog switching.

These and other objects, features and advantages of the present invention will be understood more clearly from the following detailed description and accompanying drawings.

BRIEF DESCRIPTION OF THE DRAWINGS

The preferred embodiments are described with reference to the drawings in which.

DETAILED DESCRIPTION OF THE PREFERRED EMBODIMENTS

Figure 1:
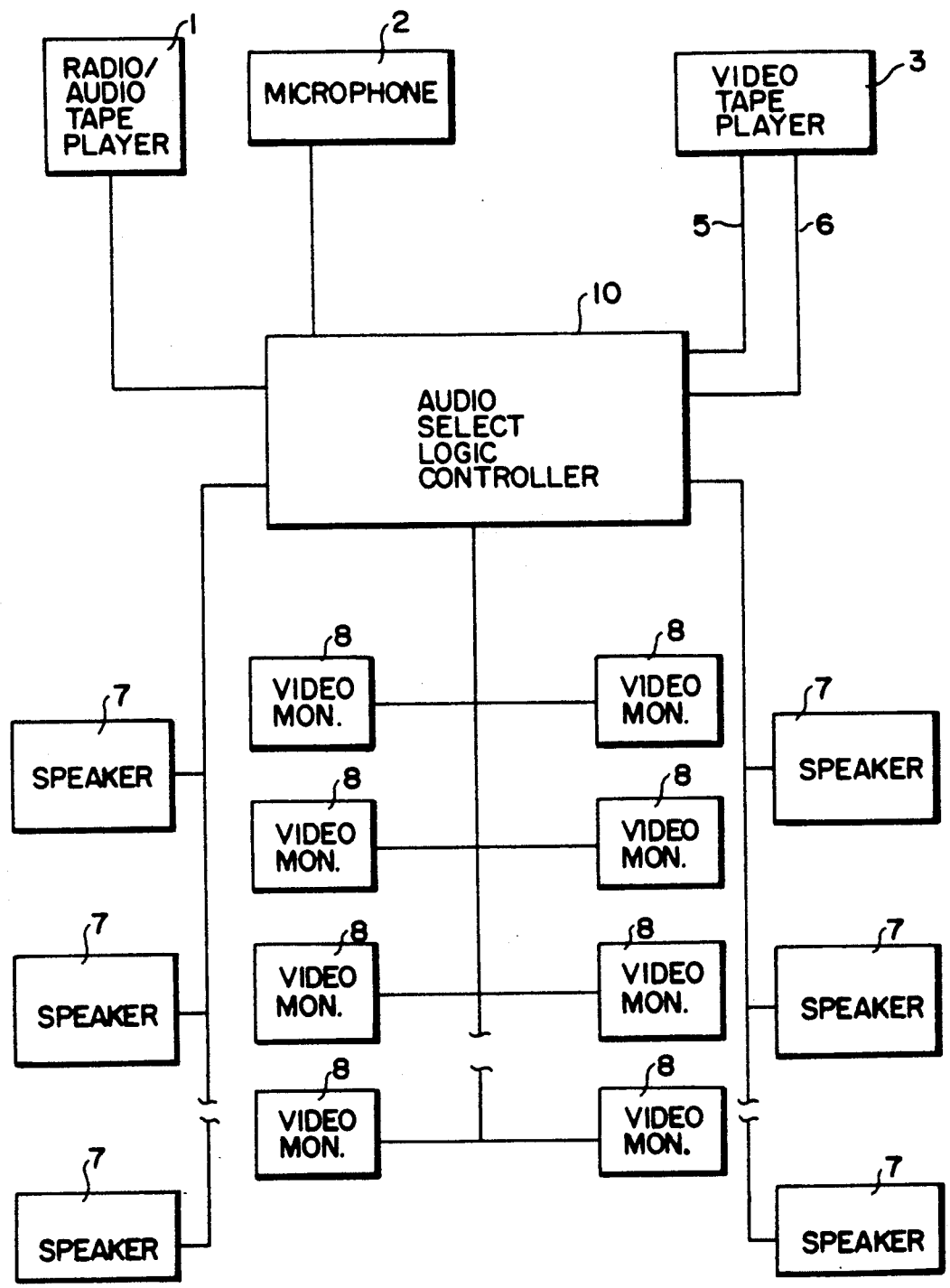
FIG. 1 is a schematic diagram showing the general arrangement an interrelationship of the various components of the video and audio signal control and distribution system according to the invention.
Figure 2A:
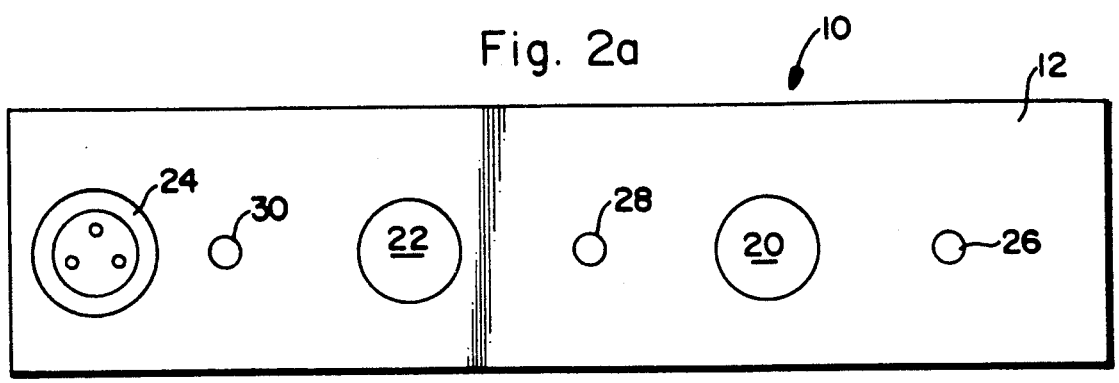
FIGS. 2(a) to 2(d) are views of the front, back, right and left side panels of the controller chassis of the video and audio signal control and distribution system according to the present invention, showing external connections on the controller chassis.
Figure 2B:
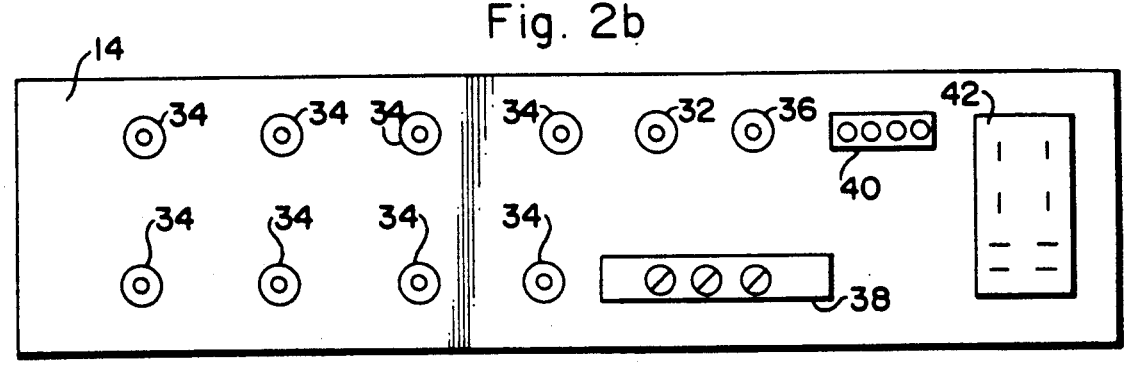
Figure 2C:
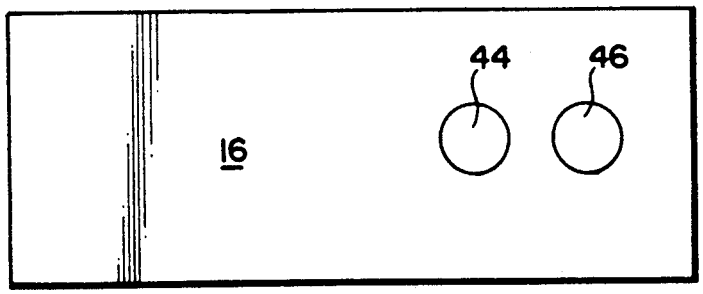
Figure 2D:
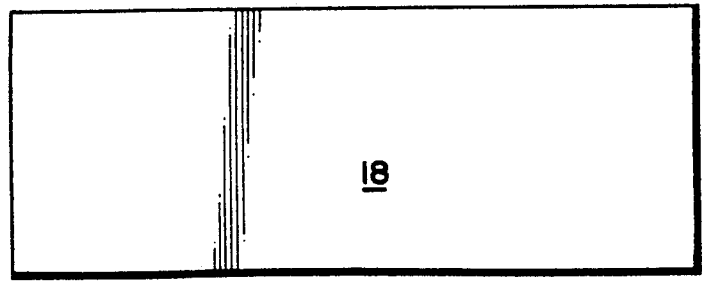

Referring to FIG. 1, a diagram of the general arrangement and interrelationship of the various components of the video and audio signal control and distribution system according to the present invention is shown. As indicated, audio select logic controller 10 is connected to and receives signals from an AM/FM radio and/or audio tape player (e.g., an audio cassette player or optical disk player) 1, a microphone 2, and a video tape player 3, such as, for example, a video cassette player/recorder (VCR). Video tape player 3 provides an audio signal via connection 5 and a video signal via connection 6 to controller 10. As described more fully below, the audio output signal of controller 10 is fed to speakers 7 and the video output signal of controller 10 is fed to video monitors 8. Only a representative number of speakers 7 and monitors 8 are shown for illustrative purposes, but FIG. 1 does not indicate any limitation on the actual number of each. The entire system is capable of being compactly contained within a mobile vehicle, such as a tour bus.

FIGS. 2(a) to 2(d) depict the external interface connections on the chassis of controller 10. The arrangement of connections is exemplary only, and other arrangements will be apparent to those skilled in the art. As shown, the chassis includes a front panel 12, a back panel 14, a right side 16 and a left side 18. Not shown are the top and bottom panels of the chassis. Included within chassis 10 are the logic control circuitry and associated components.

Front panel 12 includes video tape volume control 20, microphone volume control 22, microphone connector port 24, radio/audio tape LED indicator 26, video tape LED indicator 28 and microphone LED indicator 30. LED indicators 26, 28 and 30 indicate which one of the radio/audio tape player 1, video tape player 3 and microphone 2 is in operation (see FIG. 1).

Back panel 14 includes video signal input port 32 and eight video output connectors 34. The video signal from a video source such as a VCR unit 3 (see FIG. 1) is sent to the controller 10 through video signal input port 32. Video tape player 3 may be of any type or use any video format, such as Beta or VHS.

Back panel 14 also includes video tape audio input port 36 for connecting the audio signal from video tape player 3 to the controller 10. A trigger signal output port 38 is shown on back panel 14 and connects controller 10 to a plurality of video monitors 8. As described more fully below, the trigger signal from trigger signal output port 38 causes activation of video monitors 8 so as to display the video image from video tape player 3 when the video player audio signal is selected for distribution by the logic control circuitry.

Speaker signal output ports 40 are also shown on back panel 14, and serve as means for connecting a plurality of speakers 7 (see FIG. 1) to the audio signal selected for distribution by the logic control circuitry. Connector port 42 on back panel 14 connects a radio/audio tape player signal source 1 (see FIG. 1) to controller 10. Right side panel 16 preferably includes fuses 44 and 46 for protection of the circuitry of controller 10.

Figure 3:
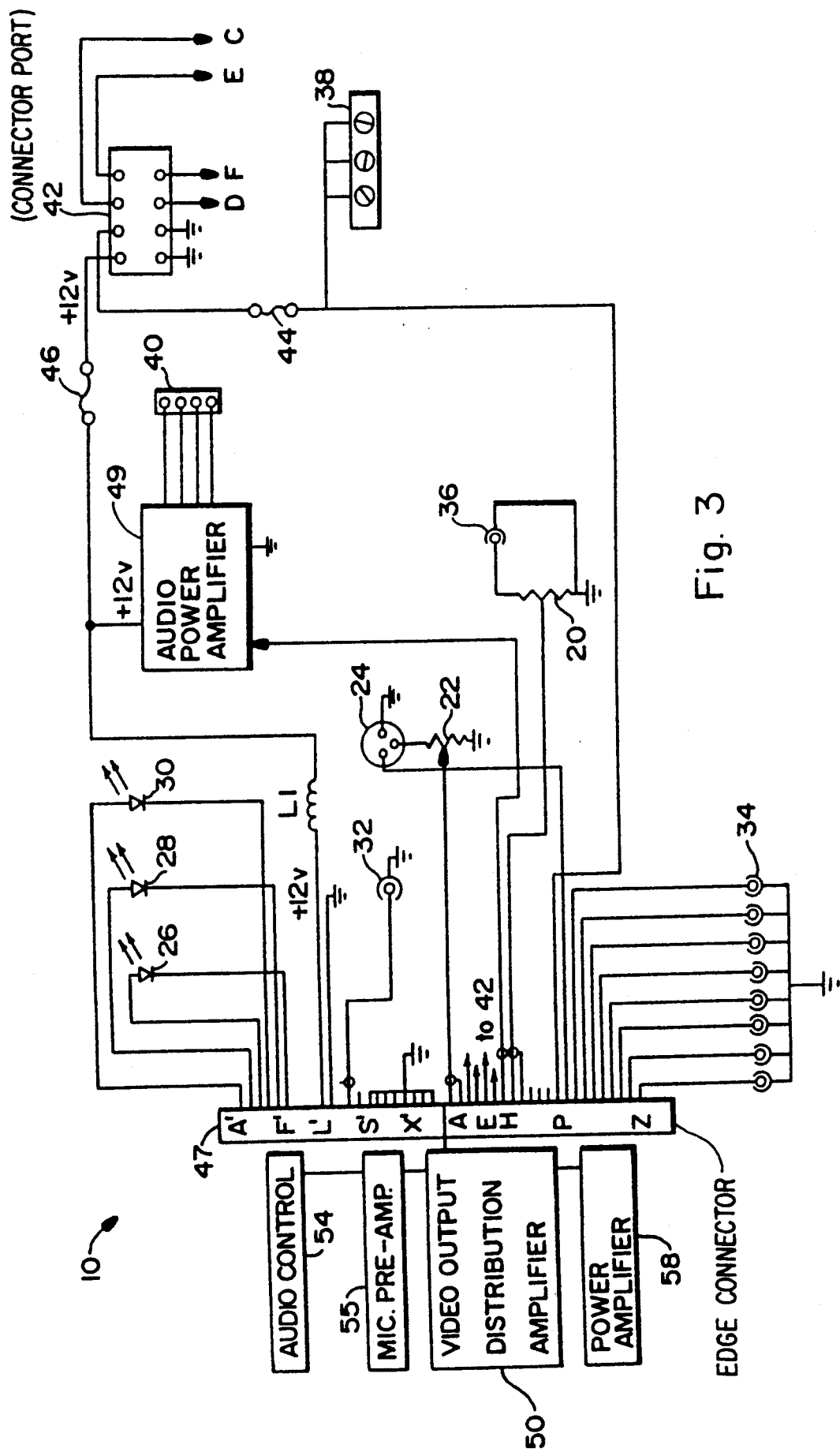
FIG. 3 is a schematic diagram showing the interconnection of the major components and pin connections of the video and audio signal control and distribution system according to the present invention.

Referring to FIG. 3, the interconnections of the major components of the video and audio signal control and distribution system controller 10 are shown. The components are interconnected through edge connector 47. The interconnections shown are representative, and other interconnections within the scope of the invention will be apparent to those skilled in the art.

Shown in FIG. 3 are the eight video output connectors 34, video signal input port 32, speaker signal output ports 40 connected to an audio power amplifier 49 for amplifying audio signals, video tape audio input port 36, video tape volume control 20, radio/audio tape player connector port 42, trigger signal output port 38, radio/audio tape LED indicator 26, video tape LED indicator 28, microphone LED indicator 30, microphone volume control 22, microphone connector port 24, and fuses 44 and 46.

As indicated, edge connector 47 interconnects the foregoing components with the audio control 154, microphone pre-amplifier 55, video output distribution amplifier 50 and power amplifier 58 of controller 10. Table 1 shows the connections made at edge connector 47 (where "MICON", "VIDON" and "RADION" mean "microphone on", "video on" and "radio on", respectively):

TABLE 1

| Edge Connector Pin Connections | |
|---|---|
| PIN | SIGNAL NAME |
| A' | MICON LED + |
| B' | VIDON LED + |
| C' | RADION LED + |
| D' | MICON LED − |
| E' | VIDON LED − |
| F' | RADION LED − |
| H' | |
| J' | |
| K' | |
| L' | +12V SUPPLY |
| M' | MAIN GND |
| N' | VIDEO IN SHIELD |
| P' | VIDEO IN |
| R' | |
| S' | VIDEO GND |
| T' | VIDEO GND |
| U' | VIDEO GND |
| V' | VIDEO GND |
| W' | VIDEO GND |
| X' | VIDEO GND |
| Y' | VIDEO GND |

TABLE 1-continued

| Edge Connector Pin Connections | |
|---|---|
| PIN | SIGNAL NAME |
| Z' | VIDEO GND |
| A | MIC SIGNAL IN |
| B | MIC SIGNAL GND |
| C | LEFT RADIO IN − |
| D | LEFT RADIO IN + |
| E | RIGHT RADIO IN − |
| F | RIGHT RADIO IN + |
| H | AUDIO OUT TO AUDIO AMP |
| J | TAPE AUDIO IN |
| K | TAPE AUDIO SHIELD |
| L | |
| M | |
| N | |
| P | VIDEO ON |
| R | PUSH TO TALK |
| S | VIDEO OUT #1 |
| T | VIDEO OUT #2 |
| U | VIDEO OUT #3 |
| V | VIDEO OUT #4 |
| W | VIDEO OUT #5 |
| X | VIDEO OUT #6 |
| Y | VIDEO OUT #7 |
| Z | VIDEO OUT #8 |

Figure 4:
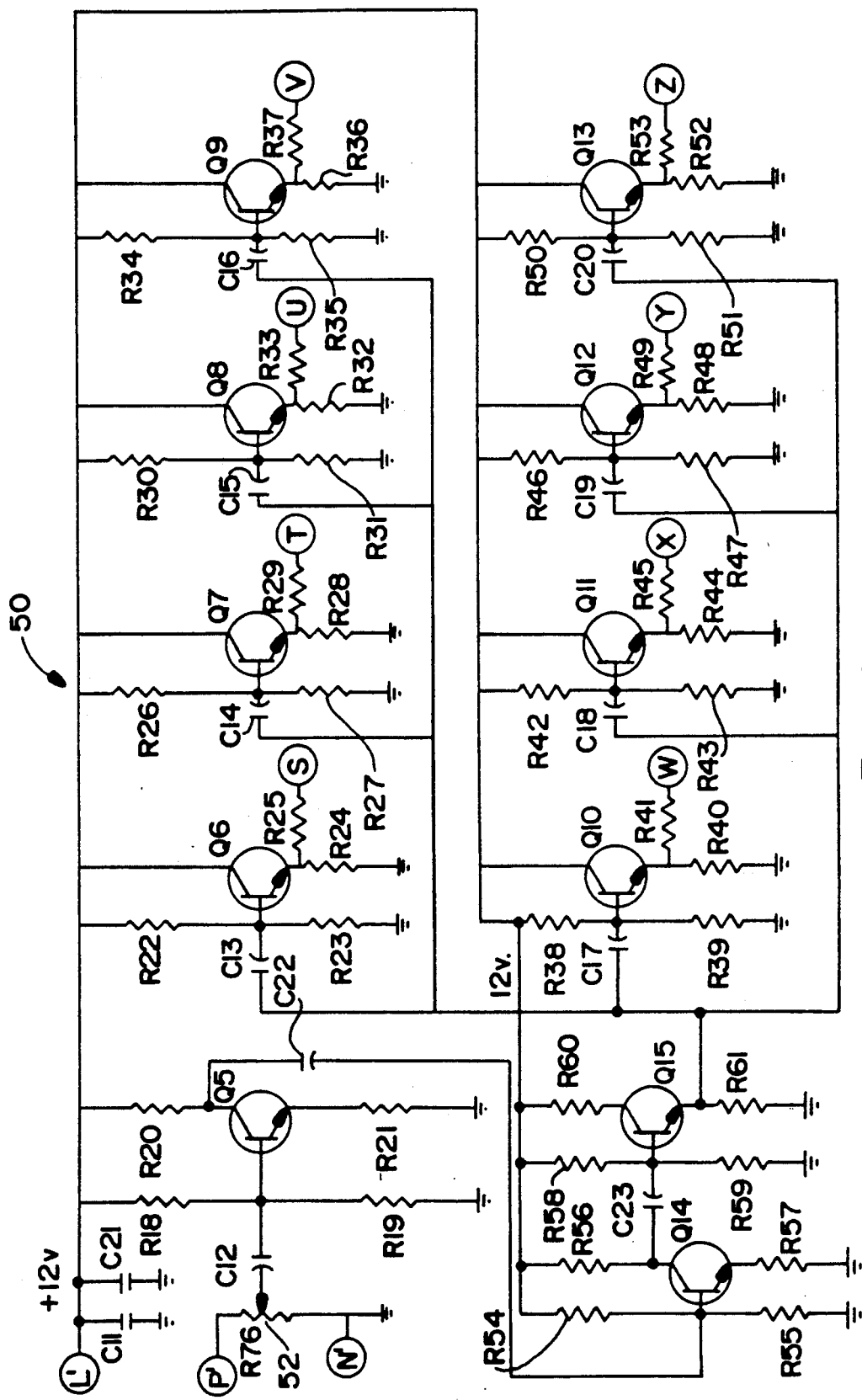
FIG. 4 is a circuit diagram showing the video amplifier of the video and audio signal control and distribution system according to the present invention.

A preferred embodiment of the video output distribution amplifier 50 is shown in FIG. 4, with edge connector pin connections indicated by circled letters. A 1000 ohm potentiometer 52 at the input of video amplifier 50 provides means for input sensitivity adjustment of the input to Q5, the first video pre-amp stage. Adjustment of potentiometer 52 enables video amplifier 50 to interface with video sources which might present large fluctuations in absolute signal level.

The first video pre-amp stage Q5 is a common emitter type amplifier with a wide bandwidth and a voltage gain of two. The inverted signal from Q5 is fed to the second pre-amp stage Q14 which is also a common emitter type amplifier with a voltage gain of two. Q14 inverts the signal from Q5 so as to present the following stage with a video signal of proper polarity (negative going sync).

The output signal of second stage pre-amp Q14 is fed to fully bias compensated common emitter amplifier stage Q15. Amplifier stage Q15 provides a non-inverted output signal to maintain the proper polarity of video signal which is to be sent to the eight final video output drivers. Q15 also provides a low output impedance necessary to drive video output transistors Q6–Q13. Output transistors Q6–Q13 are independent common collector type current amplifiers. They are biased to enable their collectors to be tied directly to the +12 volt d.c. supply rail.

The foregoing stages provide the high current and low output impedance required to drive the 75 ohm load presented to them by the coaxial cables and video color monitors 8 (see FIG. 1) connected to video output connectors 34. This aspect of the invention enables the biasing network and the 27 ohm current limiting resistors (R25, R29, R33, R37, R41, R45, R49 and R53) in series with their outputs to protect video amplifier 50 from damage either because unused outputs are left unterminated or because the unused outputs are accidentally shorted to ground during use.

The use of a 12 volt d.c. power supply for the entire amplifier 50 enables it to be adapted easily to the mobile environment, such as for use in a tour bus. Other features which enable adaptation to the mobile environment are the compact size and low supply current requirements of amplifier 50.

Figure 5:
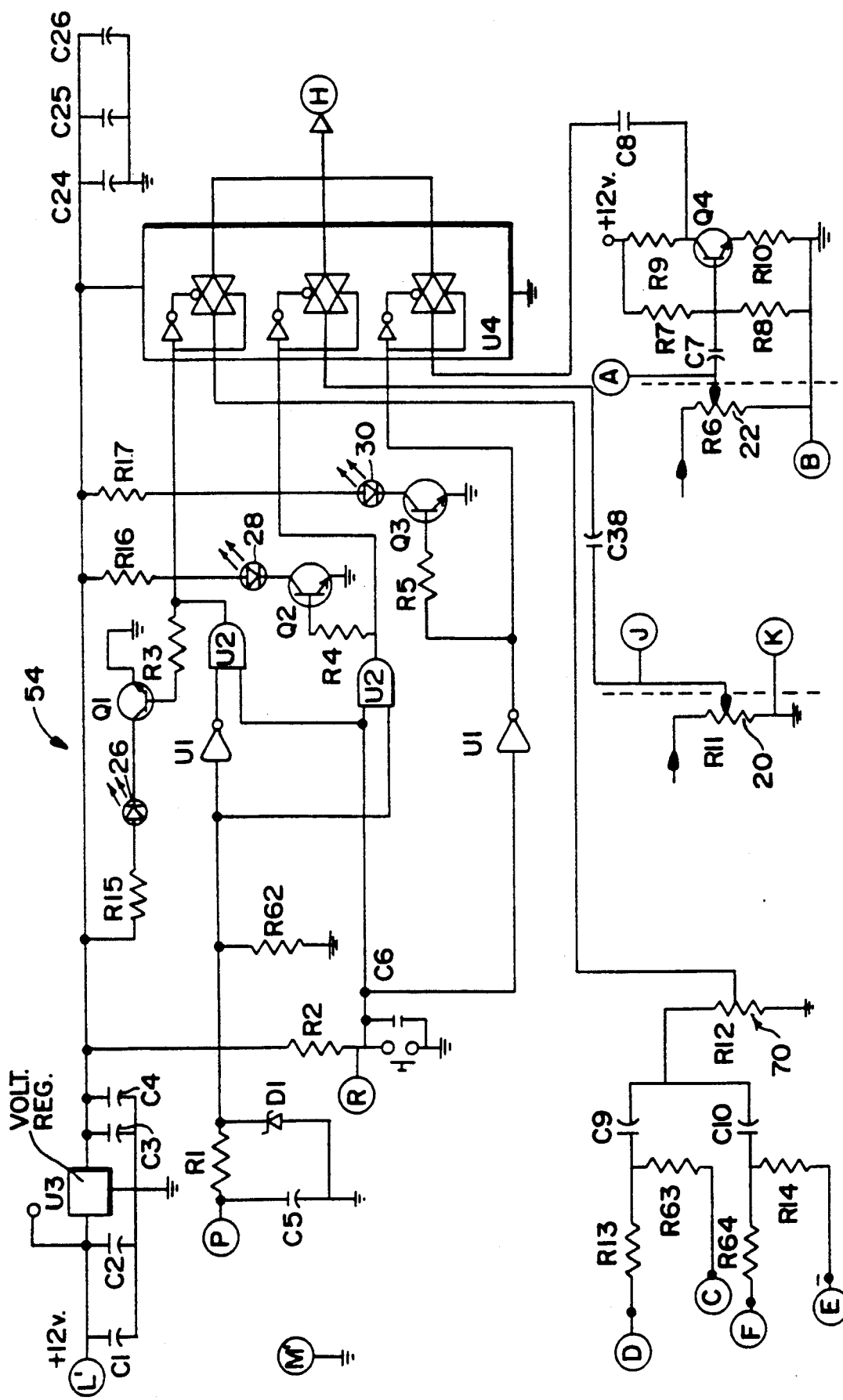
FIG. 5 is a circuit diagram showing the audio control device of the video and audio signal control and distribution system according to the present invention.

A preferred embodiment of the audio control 54 is shown in FIG. 5, edge connector pin connections again being shown as circled letters. Audio control 54 controls all of the audio signals of controller 10. The proper signal to be outputted by audio control 54 is determined by use of input control signal sensing by a logic control circuit. The operation of audio control 54 is described below.

The 12 volt d.c. power supply is applied directly to the microphone pre-amplifier Q4, which is a common emitter amplifier. Amplifier Q4 provides a gain of ten to the low level microphone input signal from a dynamic microphone 2 (see FIG. 1). The input impedance closely matches the 500-600 ohm impedance of microphones which may be used. The output signal of amplifier Q4 is fed through capacitor C8 to integrated circuit U4. The remainder of the circuitry is powered by the output of a five volt, three terminal voltage regulator U3.

Hex inverters U1 and AND gates U2 are complementary metal oxide semiconductor (CMOS) logic circuits which are used as the decision-making logic state system. The logic design provides means for the selection of the signal from one of three audio sources, the microphone, the video tape audio track and the radio/audio tape player, and for the routing of the chosen signal to the audio output of controller 10. The selection of the audio source is determined by the state of the logic control, according to the truth table set out in Table 2:

TABLE 2

| INPUTS | | |
|---|---|---|
| VIDON | MICROPHONE PUSH TO TALK | OUTPUT PIN H |
| Low | Low | Microphone |
| Low | High | Radio/Audio Tape Player |
| High | Low | Microphone |
| High | High | Video tape audio |

As can be determined from Table 2, the logic control circuitry of the present invention establishes a hierarchical arrangement of signals. The logic control circuitry enables the microphone to override either the video tape audio or the radio/audio tape output, and enables the video tape audio to take precedence over the radio/audio tape output when the video tape audio signal is present. Transistors Q1, Q2 and Q3 (FIG. 5), with their associated LED's and current limiting resistors, provide the system operator with visual indication of which audio signal has been selected by the logic control and routed to the audio output.

The logic control also provides a trigger signal to the video monitors 8 via trigger signal output port 38. When the logic control selects the video tape audio track as the audio input to the system, a trigger signal is sent to the monitors 8 (see FIG. 1), causing them to turn on. Thus, the video tape selection by the logic control not only routes the video tape audio track to the speakers, but ensures that the monitors are turned on so that the video image can be displayed.

The present invention also provides an advantageous solid state alternative to the use of traditional relays for latching the proper audio signal to the audio output. A CMOS analog switch U4 is used for that function and is a very reliable and space saving component of controller 10. Elimination of relays having mechanical contacts increases the adaptability of the present invention to the mobile environment where mechanical shock and vibrations are likely to make mechanical relays unreliable.

Additional features of the present invention are depicted in FIG. 5. The resistor network and capacitive coupling of the radio audio speaker level inputs enables the system to be connected to common ground or floating output auto stereos. A 50,000 ohm potentiometer 70 further provides audio signal input level adjustment for matching the radio signal level to the audio control.

Figure 6:
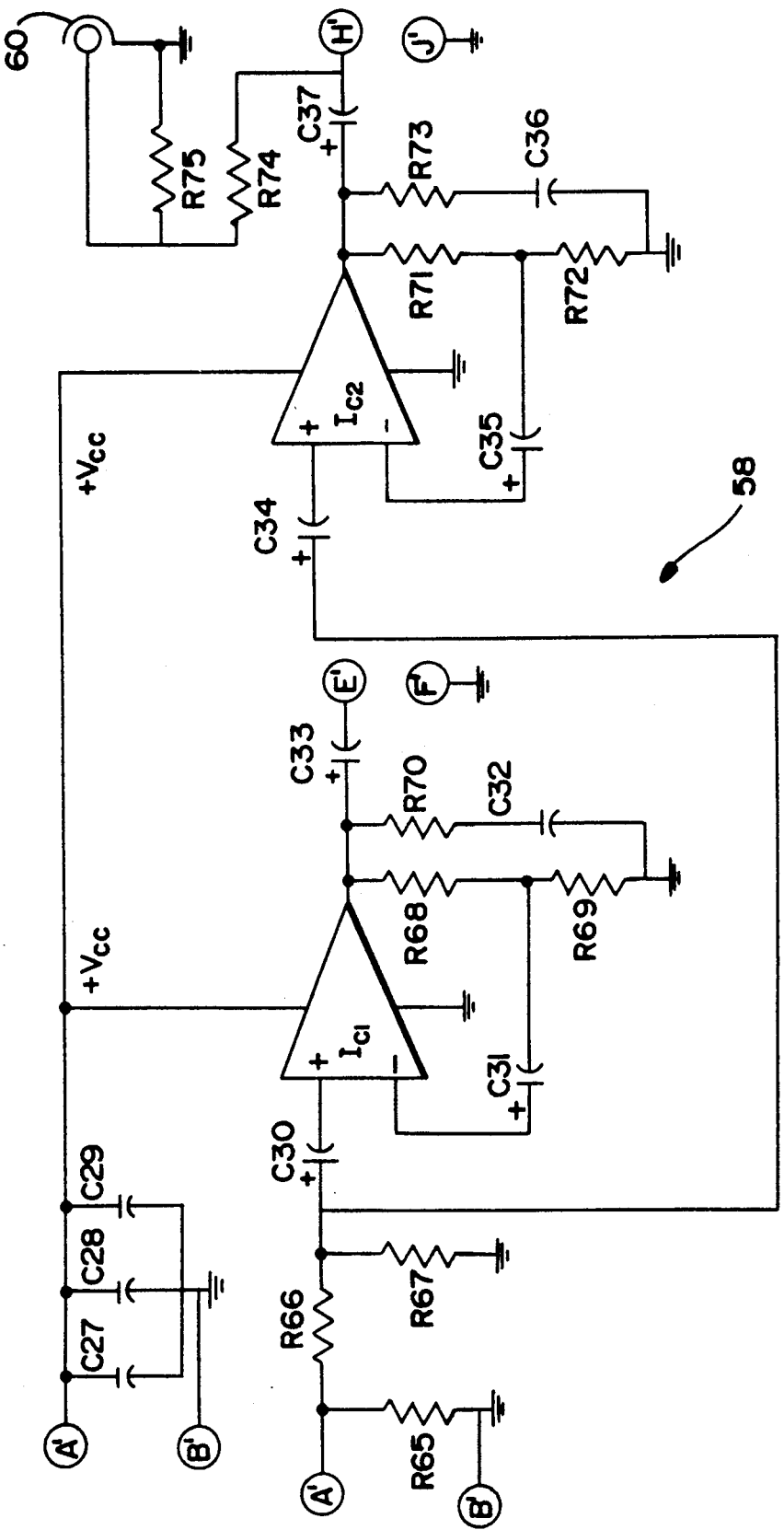
FIG. 6 is a circuit diagram showing the power amplifier of the video and audio signal control and distribution system according to the present invention.

A preferred embodiment of the power amplifier 58 is shown in FIG. 6, edge connector pin connections being shown as circled letters. Power amplifier 58 produces 6-8 watts per channel of audio power for a standard 4-8 ohm speaker system load. It is small in size (approximately 3"×2") and operates on the 12 volt d.c. power supply. Preferably, two power amplifier integrated circuits, which may be National Semiconductor IC's No. TDA2002A, are heat sunk to the chassis of controller 10. The outputs of the integrated circuits are capacitively coupled and are overload and short-circuit protected. Additionally, power amplifier 58 includes preamp output jack 60 which enables connection of additional higher power amplifiers if required.

Preferred values for the various circuit components of FIGS. 3-6 are provided in Table 3, although such values are not intended to be limiting and alternative values within the scope of the invention will be apparent to those skilled in the art:

TABLE 3

| COMPONENT | VALUE |
|---|---|
| Fuse 46 | 3 amp |
| Fuse 44 | 1 amp |
| L1 | 15 mH |
| C1 | 1000 μf |
| C2 | 100 μf |
| C3 | 10 μf |
| C4 | .1 μf |
| C5 | .1 μf |
| C6 | .1 μf |
| C7 | 1 μf |
| C8 | .33 μf |
| C9 | 10 μf |
| C10 | 10 μf |
| C11 | .1 μf |
| C12 | 10 μf |
| C13 | 10 μf |
| C14 | 10 μf |
| C15 | 10 μf |
| C16 | 10 μf |
| C17 | 10 μf |
| C18 | 10 μf |
| C19 | 10 μf |
| C20 | 10 μf |
| C21 | 100 μf |
| C22 | 10 μf |
| C23 | 10 μf |
| C24 | .01 μf |
| C25 | .01 μf |
| C26 | .01 μf |
| C27 | 100 μf |
| C28 | .1 μf |
| C29 | .01 μf |
| C30 | 10 μf |
| C31 | 470 μf |
| C32 | .1 μf |
| C33 | 1000 μf |
| C34 | 10 μf |
| C35 | 470 μf |
| C36 | .1 μf |
| C37 | 1000 μf |
| C38 | 1 μf |
| R1 | 4700 Ω |
| R2 | 10000 Ω |
| R3 | 3000 Ω |

TABLE 3-continued

| COMPONENT | VALUE |
| --- | --- |
| R4 | 3000 Ω |
| R5 | 3000 Ω |
| R6 | 1000 Ω (var.) |
| R7 | 13000 Ω |
| R8 | 1500 Ω |
| R9 | 100 Ω |
| R10 | 10 Ω |
| R11 | 50000 Ω (var.) |
| R12 | 50000 Ω (var.) |
| R13 | 1000 Ω |
| R14 | 500 Ω |
| R15 | 500 Ω |
| R16 | 500 Ω |
| R17 | 500 Ω |
| R18 | 2200 Ω |
| R19 | 1000 Ω |
| R20 | 1000 Ω |
| R21 | 500 Ω |
| R22 | 33000 Ω |
| R23 | 10000 Ω |
| R24 | 10000 Ω |
| R25 | 27 Ω |
| R26 | 33000 Ω |
| R27 | 10000 Ω |
| R28 | 10000 Ω |
| R29 | 27 Ω |
| R30 | 33000 Ω |
| R31 | 10000 Ω |
| R32 | 10000 Ω |
| R33 | 27 Ω |
| R34 | 33000 Ω |
| R35 | 10000 Ω |
| R36 | 10000 Ω |
| R37 | 27 Ω |
| R38 | 33000 Ω |
| R39 | 10000 Ω |
| R40 | 10000 Ω |
| R41 | 27 Ω |
| R42 | 33000 Ω |
| R43 | 10000 Ω |
| R44 | 10000 Ω |
| R45 | 27 Ω |
| R46 | 33000 Ω |
| R47 | 10000 Ω |
| R48 | 10000 Ω |
| R49 | 27 Ω |
| R50 | 33000 Ω |
| R51 | 10000 Ω |
| R52 | 10000 Ω |
| R53 | 27 Ω |
| R54 | 33000 Ω |
| R55 | 13000 Ω |
| R56 | 680 Ω |
| R57 | 330 Ω |
| R58 | 27000 Ω |
| R59 | 8200 Ω |
| R60 | 1000 Ω |
| R61 | 390 Ω |
| R62 | 3000 Ω |
| R63 | 500 Ω |
| R64 | 1000 Ω |
| R65 | 1000 Ω |
| R66 | 10 Ω |
| R67 | 1000 Ω |
| R68 | 220 Ω |
| R69 | 2.2 Ω |
| R70 | 1 Ω |
| R71 | 220 Ω |
| R72 | 2.2 Ω |
| R73 | 1 Ω |
| R74 | 510 Ω |
| R75 | 100 Ω |
| R76 | 1000 Ω (var.) |

The automatic selection and distribution of audio and video signals by the present invention eliminates the need for training an operator to make the proper selection and to operate the various components of the system. Moreover, the automatic selection and distribution eliminates the need for the operator of a tour bus and the like to undertake distracting mechanical adjustments during vehicle operation, thereby preventing potential hazards.

It is to be understood that the present invention is not limited to the embodiments described, and that other modifications may be made without departing from the spirit and scope of the invention. Thus, the scope of the present invention is to be determined from the appended claims and their equivalents.

I claim:

1. An audio and video signal control and distribution system comprising:
    audio entertainment means for generating first audio output signals without video output signals;
    video entertainment means for generating both video output signals and second audio output signals;
    audio select logic controller means for automatically selecting one of said first and second audio output signals to be amplified, and for automatically selecting said second audio output signals for amplification in lie of said first audio output signals when said first and second audio output signals are simultaneously received by said audio select logic controller means;
    audio amplifier means coupled to said audio entertainment means and said video entertainment means for amplifying said one of said first and second audio output signals selected by said audio select logic controller means for amplification;
    audio output means coupled to said audio amplifier means for converting said selected one of said first and second audio output signals for audible sounds;
    video output means coupled to said video entertainment means for converting said video output signals to visual images; and
    power means coupled to said audio amplifier means for supplying power to said audio and video signal control and distribution system.

2. The audio and video signal control and distribution system of claim 1, further comprising interlock means for preventing amplification by said audio amplifier means of the one of said first and second audio output signals which is not selected by said audio select logic controller means for amplification by said audio amplifier.

3. The audio and video signal control and distribution system of claim 1, further comprising microphone means for converting audible sounds to third audio output signals and for transmitting said third audio output signals to said audio amplifier means, said microphone means including an off position in which audible sounds are not converted to said third audio output signals and an on position in which audible sounds are converted to said third audio output signals, said audio amplifier means being structured for amplifying said third audio output signals.

4. The audio and video signal control and distribution system of claim 3, wherein said audio select logic controller means is structured so as to aotomatically select said third audio output signals for amplification in lieu of said first and second audio output signals when said microphone means is in said on position and said first, second and third audio output signals are simultaneously received by said audio select logic controller means.

5. The audio and video signal control and distribution system of claim 3, further comprising interlock means for preventing amplification by said audio amplifier means of said first and second audio output signals when said microphone is in said on position.

6. The audio and video signal control and distribution system of claim 1, wherein said power means is a 12 volt DC power source.

7. The audio and video signal control and distribution system of claim 1, further comprising means for coupling at least one additional power amplifier to said system.

8. The audio and video signal control and distribution system of claim 1, further comprising means for adjusting the input sensitivity of said audio amplifier means.

9. The audio and video signal control and distribution system of claim 1, further comprising means for adjusting the level of said first audio output signals to match said audio select logic controller means.

10. The audio and video signal control and distribution system of claim 1, wherein said selected one of said first and second audio output signals is latched to the audio output means by means of a solid state switch.

11. The audio and video signal control and distribution system of claim 10, wherein said solid state switch comprises a complementary metal oxide semiconductor analog switch.

12. The audio and video signal control and distribution system of claim 1, wherein said audio entertainment means includes a radio and said first audio output signals comprise radio frequency signals.

13. The audio and video signal control and distribution system of claim 1, wherein said audio entertainment means includes magnetic tape audio reproduction means.

14. The audio and video signal control and distribution system of claim 1, wherein said audio entertainment means includes optical disk audio reproduction means.

15. The audio and video signal control and distribution system of claim 1, wherein said video means includes video tape audio and video reproduction means.

16. The audio and video signal control and distribution system of claim 1, wherein said audio output means comprises at least one accoustical speaker.

17. The audio and video signal control and distribution system of claim 1, wherein said video output means comprises at least one video monitor.

18. The audio and video signal control and distribution system of claim 1, further comprising video output distribution amplifier means for distributing said video output signals to said video output means.

19. The audio and video signal control and distribution system of claim 18, further comprising means for adjusting the input sensitivity of said video output distribution amplifier means.

20. An audio and video signal control and distribution system comprising:
audio entertainment means for generating first audio output signals without video output signals;
video entertainment means for generating both video output signals and second audio output signals;
microphone means for converting audible sounds to third audio output signals, said microphone means including an off position in which audible sounds are not converted to said third audio output signals and an on position in which audible sounds are converted to said third audio output signals;
audio select logic controller means for automatically selecting one of said first, second and third audio output signals for amplification in a predetermined order of priority;
audio amplifier means coupled to said audio entertainment means, said video entertainment means and said microphone means for amplifying said one of said first, second and third audio output signals selected by said audio select logic controller means for amplification;
audio output means coupled to said audio amplifier means for converting said selected one of said first, second and third audio output signals to audible sounds;
video output means coupled to said video entertainment means for converting said video output signals to visual images; and
power means for supplying power to said audio and video signal control and distribution system.

21. The audio and video control and distribution system of claim 20, wherein said audio select logic controller means automatically selects said third audio output signals for amplification in lieu of said first and second audio output signals when said microphone means is in said on position and said first, second and third audio output signals are simultaneously received by said audio select logic controller, and further wherein said audio select logic controller means automatically selects said second audio output signals for amplification in lieu of said first audio output signals when said first and second audio output signals are simultaneously received by said audio select logic controller means in the absence of said third audio output signals.

22. An audio and video signal control and distribution system comprising:
at least one member selected from the group consisting of a radio, a magnetic tape player and an optical disk player, for generating first audio output signals without video output signals;
a video tape player for generating both video output signals and second audio output signals;
a microphone for converting audible sounds to third audio output signals, said microphone including an off position in which audible sounds are not converted to said third audio output signals and an on position in which audible sounds are converted to said third audio output signals;
audio select logic controller means for automatically selecting one of said first, second and third audio output signals for amplification in a predetermined order of priority;
an audio amplifier coupled to said at least one member, said video tape player, and said microphone, for amplifying said one of said first, second and third audio output signals selected by said audio select logic controller means for amplification;
at least one acoustical speaker coupled to said audio amplifier for converting said selected one of said first, second and third audio output signals to audible sounds;
at least one video monitor coupled to said video tape player for converting said video output signals to visual images; and
a 12 volt direct current power supply coupled to said audio amplifier for supplying power to said audio and video signal control and distribution system.

23. The audio and video signal control and distribution system of claim 22, wherein said system includes a plurality of accoustical speakers coupled to said audio amplifier for converting said selected one of said first, second and third audio output signals to audible sounds.

24. The audio and video signal control and distribution system of claim 22, wherein said system includes a plurality of video monitors coupled to said video tape player for converting said video output signals to visual images.

25. The audio and video signal control and distribution system of claim 22, further including means for coupling at least one additional power amplifier to said system.

26. The audio and video signal control and distribution system of claim 22, further including interlock means for preventing amplification by said audio amplifier of the ones of said first, second and third audio output signals which are not selected by said audio select logic controller for amplification by said audio amplifier.

27. The audio and video signal control and distribution system of claim 22, further comprising a video output distribution amplifier for distributing said video output signals to said video output means.

28. The audio and video signal control and distribution system of claim 27, further comprising means for adjusting the input sensitivity of said video output distribution amplifier.

29. The audio and video signal control and distribution system comprising:
at least one member selected from the group consisting of a radio, a magnetic tape player and an optical disk player, for generating first audio output signals without video output signals;
a video tape player for generating both video output signals and second audio output signals;
a microphone for converting audible sounds to third audio output signals, said microphone including an off position in which audible sounds are not converted to said third audio output signals and an on position in which audible sounds are converted to said third audio output signals;
audio select logic controller means for automatically selecting one of said first, second and third audio output signals for amplification in a predetermined order of priority;
an audio amplifier coupled to said at least one member, said video tape player, and said microphone, for amplifying said one of said first, second and third audio output signals selected by said audio select logic controller means for amplification;
a plurality of acoustical speakers coupled to said audio amplifier for converting said selected one of said first, second and third audio output signals to audible sounds;
a plurality of video monitors coupled to said video tape player for converting said video output signals to visual images;
means for coupling at least one additional power amplifier to said system;
interlock means for preventing amplification by said audio amplifier of the ones of said first, second and third audio output signals which are not selected by said audio select logic controller means for amplification by said audio amplifier; and
a 12 volt direct current power supply coupled to said audio controller for supplying power to said audio and video signal control and distribution system.

30. An audio and video signal control and distribution system comprising:

audio entertainment means for generating first audio output signals;
video entertainment means for generating video output signals and second audio output signals;
audio select logic controller means for automatically selecting one of said first and second audio output signals for amplification in a predetermined order of priority;
audio amplifier means coupled to said audio entertainment means and said video entertainment means for amplifying said one of said first and second audio output signals selected by said audio select logic controller means for amplification;
audio output means coupled to said audio amplifier means for converting said selected one of said first and second audio output signals to audible sounds;
video output means coupled to said video entertainment means for converting said video output signals to visual images;
power means coupled to said audio amplifier means for supplying power to said audio and video signal control and distribution system; and
video output distribution amplifier means for distribution said video output signals to said video output means, said video output distribution amplifier means comprising a two stage input buffer preamplifier and a plurality of capacitively coupled common collector type amplifier stages.

31. The audio and video signal control and distribution system of claim 30, wherein each of said plurality of amplifier stages is constructed so as to provide a low impedance output which is independent of the other amplifier stages.

32. An audio and video signal control and distribution system comprising:
at least one member selected from the group consisting of a radio, a magnetic tape player and an optical disk player, for generating first audio output signals;
a video tape player for generating video output signals and second audio output signals;
a microphone for converting audible sounds to third audio output signals, said microphone including an off position in which audible sounds are not converted to said third audio output signals and an on position in which audible sounds are converted to said third audio output signals;
audio select logic controller means for automatically selecting one of said first, second and third audio output signals for amplification in a predetermined order of priority;
an audio amplifier coupled to said at least one member, said video tape player, and said microphone, for amplifying said one of said first, second and third audio output signals selected by said audio select logic controller means for amplification;
at least one acoustical speaker coupled to said audio amplifier for converting said selected one of said first, second and third audio output signals to audible sounds;
at least one video monitor coupled to said video tape player for converting said video output signals to visual images;
a 12 volt direct current power supply coupled to said audio amplifier for supplying power to said audio and video signal control and distribution system; and video output distribution amplifier means for distributing said video output signals to said video output means, said video output distribution amplifier means comprising a two stage input buffer preamplifier and a plurality of capacitively coupled common collector type amplifier stages.

33. The audio and video signal control and distribution system of claim 32, wherein each of said plurality of amplifier stages is constructed so as to provide a low impedance output which is independent of the other amplifier stages.

34. An audio and video signal control and distribution system comprising:

audio entertainment means for generating first audio output signals;

video entertainment means for generating video output signals and second audio output signals;

microphone means for converting audible sounds to third audio output signals, said microphone means including an off position in which audible sounds are not converted to said third audio output signals and an on position in which audible sounds are converted to said third audio output signals;

audio select logic controller means for automatically selecting one of said first, second and third audio output signals for amplification in a predetermined order of priority;

audio amplifier means coupled to said audio entertainment means, said video entertainment means and said microphone means for amplifying said one of said first, second and third audio output signals selected by said audio select logic controller means for amplification;

audio output means coupled to said audio amplifier means for converting said selected one of said first, second and third audio output signals to audible sounds;

video output means coupled to said video entertainment means for converting said video output signals to visual images;

power means for supplying power to said audio and video signal control and distribution system; and video output distribution amplifier means for distributing said video output signals to said video output means, said video output distribution amplifier means comprising a two stage input buffer preamplifier and a plurality of capacitively coupled common collector type amplifier stages.

35. The audio and video signal control and distribution system of claim 34, wherein each of said plurality of amplifier stages is constructed so as to provide a low impedance output which is independent of the other amplifier stages.

36. An audio and video signal control and distribution system comprising:

at least one member selected from the group consisting of a radio, a magnetic tape player and a optical disk player, for generating first audio output signals;

a video tape player for generating video output signals and second audio output signals;

a microphone for converting audible sounds to third audio output signals, said microphone including an off position in which audible sounds are not converted to said third audio output signals and an on position in which audible sounds are converted to said third audio output signals;

audio select logic controller means for automatically selecting one of said first, second and third audio output signals for amplification in a predetermined order of priority;

an audio amplifier coupled to said at least one member, said video tape player, and said microphone, for amplifying said one of said first, second and third audio output signals selected by said audio select logic controller means for amplification;

a plurality of acoustical speakers coupled to said audio amplifier for converting said selected one of said first, second and third audio output signals to audible sounds;

a plurality of video monitors coupled to said video tape player for converting said video output signals to visual images;

means for coupling at least one additional power amplifier to said system;

interlock means for preventing amplification by said audio amplifier of the ones of said first, second and third audio output signals which are not selected by said audio select logic controller means for amplification by said audio amplifier;

a 12 volt direct current power supply coupled to said audio amplifier for supplying power to said audio and video signal control and distribution system; and video output distribution amplifier means for distributing said video output signals to said video output means, said video output distribution amplifier means comprising a two stage input buffer preamplifier and a plurality of capacitively coupled common collector type amplifier stages.

37. The audio and video signal control and distribution system of claim 36, wherein each of said plurality of amplifier stages is constructed so as to provide a low impedance output which is independent of the other amplifier stages.

* * * * *

UNITED STATES PATENT AND TRADEMARK OFFICE
CERTIFICATE OF CORRECTION

PATENT NO. : 5,034,808
DATED : July 23, 1991
INVENTOR(S) : Harold R. MURRAY

It is certified that error appears in the above-identified patent and that said Letters Patent is hereby corrected as shown below:

Col. 10, Claim 1, line 21, change "lie" to --lieu--;

line 32, change "for" to --to--.

Col. 10, Claim 4, line 60, change "aotomatically" to --automatically--.

Col. 13, Claim 29, line 27, change "The" to --An--;

line 41, change "controller" to --amplifier--.

Signed and Sealed this

Nineteenth Day of January, 1993

Attest:

DOUGLAS B. COMER

*Attesting Officer*   Acting Commissioner of Patents and Trademarks